Oct. 6, 1970      G. P. HALBERG      3,531,984

DIRECT VIEW APPLANATION TONOMETER

Filed Oct. 26, 1967

$F_1 \geq F_3 \gg [F_1 + e + g] - F_2$

INVENTOR
G. PETER HALBERG

BY Robert Bruce Brodie

ATTORNEY

United States Patent Office 3,531,984
Patented Oct. 6, 1970

3,531,984
DIRECT VIEW APPLANATION TONOMETER
Gyula Peter Halberg, 40 W. 77th St.,
New York, N.Y. 10024
Filed Oct. 26, 1967, Ser. No. 678,406
Int. Cl. A61b 3/16
U.S. Cl. 73—80
9 Claims

ABSTRACT OF THE DISCLOSURE

A direct view applanation tonometer providing optical indication of verticality of the instrument and under and over applanation of the cornea. The tonometer comprises a lens, support means containing the lens, and optically transparent applanating means movably mounted in the support means along the optical axis of the lens. The applanating means has reference markings thereon for parallax indication. Images of an applanated cornea are defocused as viewed through the lens indicative of excess or insufficient pressure application, when the distance between the lens and the applanating means is not within a predetermined range.

BACKGROUND OF THE INVENTION

This invention relates to improvements in applanation tonometers, and more particularly, to improvements in direct view applanation tonometers.

In applanation tonometry, an area of the cornea of the eye is flattened by applying a plane surface against the eyeball. The tonometric pressure is determined from the ratio between the force with which the surface is applied against the eyeball and the size of the flattened area of the cornea. The intraocular pressure multiplied by the magnitude of the flattened area equals the force with which the surface is pressed against the eyeball. From this relation, the ocular *pressure* may be determined from a measure of a *known force* and an *observed area* size.

A prior art example of a direct view applanation tonometer appears in the "Transactions of the Ophthalmological Society of the United Kingdom" in vol. 73 at pp. 261 to 266 (1953) as described by Perkins. The Perkins direct view applanation tonometer comprises a transparent cylinder of known weight having a dark linear scale on the applanating end of the cylinder and magnification optics on the opposite end. This instrument was applied perpendicular to the corneal tear layer of the eye when the patient is supine. The applanated area was observed through the lens. There was no safeguard against over-applanation or under-applanation. Illustratively, over-applanation frequently occurs when the ocular pressure is normal or sub-normal.

Among other difficulties attending the use of such prior art instruments was knowing whether the instrument was correctly placed perpendicular to the eye at the point of contact. Incorrect placement results in an unknown vertical force component being used resulting in an incorrect measure determination. Related to this aspect is the fact that applanation tonometers are as a rule hand-held gravity actuated instruments. Consequently, the center of gravity of the instrument affects the balancing and placement. If the tonometer is to be reliable and easy to operate, then a premium is placed upon simplicity and convenience in overcoming prior art disadvantages.

It is accordingly an object of this invention to devise a direct view applanation tonometer which provides simple and convenient indication of perpendicularity with reference to an applanated cornea, and further provides simple and convenient indication of both under- and over-applanation. It is a related object to devise an improved mechanical design permitting ease of balancing.

SUMMARY OF THE INVENTION

The objects of this invention are satisfied by an embodiment comprising a lens, a support means containing the lens, and an optically transparent applanating means movably mounted in the support along the optical axis of the lens. The applanating means, which may be a plane end of a transparent cylinder, has high contrast reference markings thereon. Parallax between an applanated cornea and the high contrast reference markings, as viewed through the lens, shows non-perpendicularity of the instrument. If the images of the applanated cornea are defocused by the applanating means, also as viewed through the lens, then either over- or under-applanation occurs. The defocusing occurs when the distance is not within a predetermined range. This corresponds to the positioning of the tonometer upon the eye and the pushing down with a force more than or less than the predetermined force (e.g. 5 grams weight).

The reference markings embossed on the applanating surface are formed from a color exhibiting high contrast to the dark area of the pupil and the dark tissues of the iris. This permits easier detection of parralax, as well as enhancing the measurement of the observed applanated area. The reference markings may comprise a scale of white graduated markings constituting a linear scale or a system of concentric circles.

If it appears that the eye is under-applanated provision may be made for the convenient addition of known fixed weights to the applanating means. This is embodied in the form of twist-off weights secured to the support means when not in use. The weight is slidable along an extent of the cylinder. A retaining lip along the cylinder supports the twist-off weight.

DESCRIPTION OF THE PREFERRED EMBODIMENT

Figure 1:
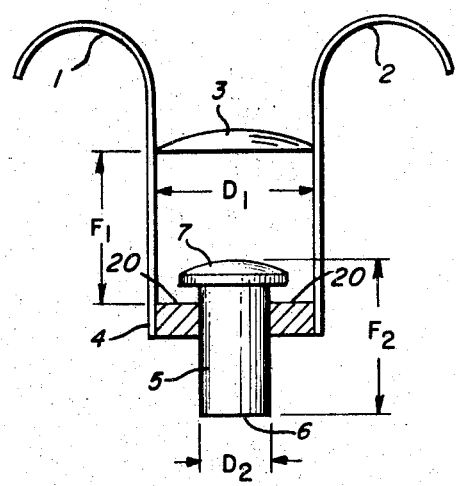
FIG. 1 is an elevation view of the invention showing the movable applanating means in relation to the support and the lens.

In FIG. 1, lens 3 is mounted in support 4. The support includes two metal finger loops 1 and 2 by which the tonometer may be manually grasped. Lens 3 is fixed in position between the metal finger loops. A bottom mmeber 20 is spaced at a distance $F_1$ (2.7 millimeters) from the lens.

An applanating cylinder 5 made from any suitably optically transparent material such as Plexiglas, is slidably positioned in the lower support member. A bottom end 6 having diameter $D_2$ (1.2 millimeters) serves as an applanating surface. The main axis of the applanating cylinder is aligned along the optical axis of the lens. The cylinder of length $F_2$ (2.3 millimeters) terminates in the other surface 7.

Figure 2A:
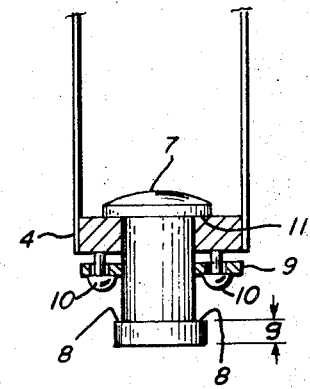
FIG. 2A is a detailed cross section showing the mounting of the applanating cylinder in the support and the rotatably secured additional weights.

In FIG. 2A, surface 7 includes a retaining lip 11 which maintains the cylinder at its maximum distance from the lens. Another retaining lip 8 is used to restrain motion of the cylinder towards the lens. It may be formed from a simple metal band surrounding the bottom of the cylinder adjacent surface 6. The metal strip provides a stopping action at $g$ (0.3 millimeter) from the bottom surface 6. The retaining lip 8 is of sufficient transverse dimension to restrain the movement of an additional weight 9 which may be dropped onto the retaining lip 8 so as to provide additional applanation force in situations of under-applanation. The additional weight 9 is rotably secured to support 4 by elements 10.

Figure 2B:
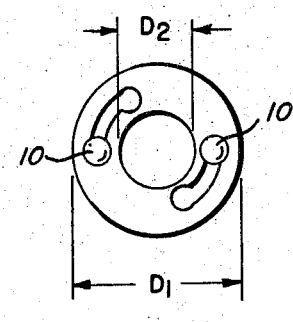
FIG. 2B is a bottom view showing the applanating cylinder and the rotably secured additional weights.

FIG. 2B shows a bottom view of the additional weights 9 and their retention on element 10. The weights in the form of discs are a fraction of the cylinder weight. For example, the disc is 2½ grams when the cylinder is 5 grams. The disc is secured to the support by the twist-on connection. In this position it does not affect applanation because no force is being exerted by the support on the cylinder. Upon twisting-off the disc is slidable along the cylinder where it can rest upon a retaining lip (see FIG. 3) and exert additional force.

Figure 2C:
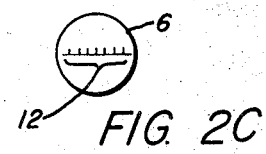
FIG. 2C shows calibrated scale markings embossed on the applanating surface 6.

Reference markings, as for example shown as a linear scale 12 in FIG. 2C by which the applanated area may be measured, may be embossed on surface 6. In the prior art such reference markings have been in the form of black graduated scales or concentric circles. This presents an intolerably low contrast with the black pupil and dark tissues of the iris. A high contrast color preferably white or a luminescent orange or green provides suitable contrast for detecting both parallax and defocusing.

Referring again to FIGS. 1 and 2A of the drawing, it has been found that the surface 7 of the cylinder 5 may be fashioned to form a convex lens. Similarly, lens 3 may also preferably form a convex lens. The simple magnification power of the two convex lens system should lie in the range between 7 and 15 diopters. Significantly, the range of sharp focus of the lens system ought to be limited to the mid-portion of the applanating cylinder 5. This serves as a safeguard against over or under-applanation.

Operationally, a patient is placed in a horizontal position and the corneal surface of his eye is desensitized or anesthetized with a few drops of a solution containing proparacaine hydrochloride. Additionally, a dilute solution of fluorescein may be added to the eye. This, however, is not mandatory because the light diffraction ring at the edge of the applanated area under usual examination room lighting conditions permits a reliable measurement.

In this embodiment the cylinder 5 is gravity activated so that plane surface 6 is placed perpendicular to the point of contact on the upturned eye. Lack of perpendicularity is detected through lens 3 as parallax between the high contrast reference marking 12 embodied into surface 6 and the applanating cornea.

As another safeguard to assure that the proper vertical force component is being applied to the eye by the cylinder, the defocusing of the cornea through the lens system 6 and 7 serves as an index of over and under applanation. For example, a vertical force component in excess of the weight of cylinder 5 may be applied to the eye by the inadvertent impingement of support 4 on retaining lip 8. This over-applanates the eye. The corneal image is defocused as viewed through lens 3. Similarly, a vertical force component less than the weight of cylinner 5 may be applied to the eye by the inadvertent impingement of support 4 on retaining lip 11. This under-applanates the eye. The corneal image is again out of the range of focus of the mid-portion of cylinder 5 as seen in lens 3.

Figure 3:
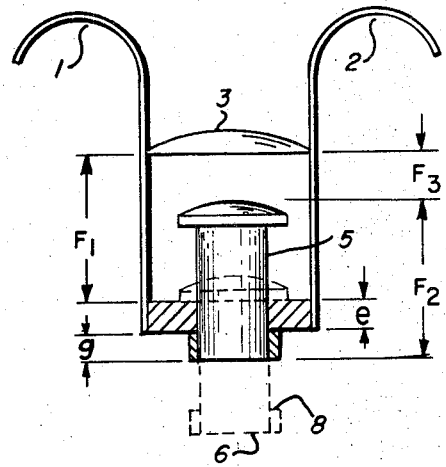
FIG. 3 illustrates the geometrical relationships between the lens, the support, and the focus range of the applanating cylinder.

Referring now to FIG. 3 of the drawing, there are shown and labelled linear dimensions relating several different lengths along the optical axis of lens 3 and cylinder 5. Now $F_1$ is the fixed distance between lens 3 and the top of support 4. Also, $F_2$ is the fixed length of the cylinder between surfaces 6 and 7. $F_3$, however, is the variable distance between lens 3 and surface 7. The dimensions $e$ and $g$ are respectively the thickness of support 4 and band 8.

Relating the distances, it is apparent that $$F_3 = (F_1 + e + g) - F_2$$

when the cylinder is thrust upward and retaining lip 8 is forced against support 4. This corresponds to the over-applanation condition discussed previously. Further, $F_3 = F_1$ when the cylinder is retained in support 4 by lip 11. This refers to the under-applanation condition. Thus, as a first approximation, $$F_3 \leqq F_1 \text{ and } F_3 >> (F_1 + e + g) - F_2.$$

Restated, $F_3$ lies in the range $F_1 \geqq F_3 >> (F_1 + e + g) - F_2$. The combination of minimizing parallax and maintaining sharp focus assures perpendicularity and the correct applanating force of the cylinder on the eye.

In summary, a direct view applanation tonometer has been described which provides optical indication of perpendicularity and under- or overapplanation. Non-perpendicularity is detected by parallax between an applanated cornea and the high contrast reference markings embossed upon the applanating surface of a slidably mounted optically transparent cylinder. Excessive pressure, or indeed insufficiency of pressure is observed by the defocusing of images of an applanated cornea as viewed through a lens at a distance along a common optical axis with the cylinder. While the invention has been described in connection with a preferred embodiment, it should be understood that the optically transparent applanating means and lens may be modified to include a variety of different refractory combinations both of a divergent as well as a convergent nature. Such refractory combinations may be so designed to operate over only a portion of the optical band width. The band width requirements are well within the capabilities of the skilled optical artisan and when used as an aspect of the invention do not depart from the scope of the appended claims.

What is claimed is:
1. A direct view applanation tonometer comprising:
 a lens;
 support means containing the lens; and
 optically transparent applanating means including an applanating surface with high contrast reference markings thereon, the applanating means including the applanating surface together being movably mounted in the support means relative to the focal plane of the lens and along the optical axis of the lens, the applanating means further providing indication of perpendicularity of the tonometer by the absence of parallax between the applanated cornea and the high contrast reference markings as viewed through the lens.

2. A direct view applanation tonometer providing optical indication of perpendicularity and incorrect applanation comprising:
 a lens;
 support means containing the lens; and
 optically transparent applanating means movably mounted in the support means including:
  an applanating surface having high contrast reference markings thereon for parallax indication between an applanated cornea and the reference markings as viewed through the lens;
  means for defocusing images of the applanated cornea when the distance between the lens and the applanating surface is not within a predetermined range.

3. A direct view applanation tonometer according to claim 2, characterized in that the reference markings are formed from a color exhibiting high contrast to the dark area of the pupil and dark tissues of the iris.

4. An applanation tonometer according to claim 2, characterized in that the applanating means comprises:
 an optically permeable cylindrically shaped mass having one end thereof forming an applanating surface, the applanating surface having superimposed thereon high contrast reference markings.

5. A direct view tonometer comprising:
a lens;
support means containing the lens;
an optically transparent cylindrically shaped mass movably mounted in the support means along the optical axis of the lens and having one end thereof forming an applanating surface with high contrast markings superimposed thereon, indication of perpendicularity of the tonometer being provided by the absence of parallax between the applanated cornea and the high contrast reference markings as viewed through the lens, the defocusing of images of the applanated cornea being indicative of incorrect applanation when the distance between the lens and the optical cylinder is not within a predetermined range;
a retaining lip running circumferentially around the applanating surface end of the cylinder; and
a fixed weight secured to the support means by a twist on-twist off connection and slidable along a portion of the cylinder length when twisted off the support means, the fixed weight impinging thereby upon the retaining lip.

6. A direct view applanation tonometer comprising:
a lens;
a rigid frame whose major axis is of length $F_1$, the frame supporting the lens at one end of the axis and a transverse support member of thickness "$e$" at the other end of the axis;
an optically permeable cylindrically shaped mass of length $F_2$ slidably mounted in the transverse support member along the optical axis of the lens, the cylinder having one end thereof forming an applanating surface with high contrast reference markings superimposed thereon, a variable distance $F_3$ being defined by the lens and the other surface of the cylinder, the images of an applanated cornea being in focus only when $F_3$ is within the range defined by $F_1 \geq F_3 >> [F_1 + e] - F_2$.

7. A direct view applanation tonometer providing optical indication of perpendicularity and incorrect applanation comprising:
a lens;
support means containing the lens; and
optically transparent applanating means movably mounted in the support means within a predetermined traverse and including:

an applanating surface having reference markings thereon for parallax indication between an applanated cornea and the reference markings as viewed through the lens; and
means for refractively projecting the corneal image upon the lens so as to form a lens system having a sharp range of focus only when the applanating means lies within a limited pre-selected portion of the traverse.

8. A direct view applanation tonometer according to claim 7, wherein the lens and the refractive projecting means form a convex lens system.

9. A direct view applanation tonometer according to claim 7, wherein:
the applanating means comprise:
an optically transparent cylindrically shaped mass movably mounted within the support means within a predetermined traverse lying along the optical axis of the lens, one end thereof forming the applanating surface;
a retaining lip running circumferentially around the applanating surface end of the cylinder; and
a fixed weight secured to the support means by a twist on-twist off connection and slidable along a portion of the cylinder length when twisted off the support means, the fixed weight impinging thereby upon the retaining lip.

References Cited

UNITED STATES PATENTS

| | | | |
|---|---|---|---|
| 2,314,514 | 3/1943 | Parsons | 73—80 |
| 2,780,221 | 2/1957 | Posner | 73—80 X |
| 3,301,131 | 1/1967 | Benford | 73—80 |
| 3,338,090 | 8/1967 | Coombs | 73—80 |

FOREIGN PATENTS

| | | |
|---|---|---|
| 880,987 | 4/1943 | France. |

OTHER REFERENCES

"A Simple Applanation Tonometer," E. S. Perkins, Transactions of the Ophthalmological Society of the United Kingdom, vol. 73, pp. 261–266, 1953.

CHARLES A. RUEHL, Primary Examiner